Oct. 28, 1958  H. C. PORTER  2,857,777
GEAR ASSEMBLY
Filed Feb. 7, 1955
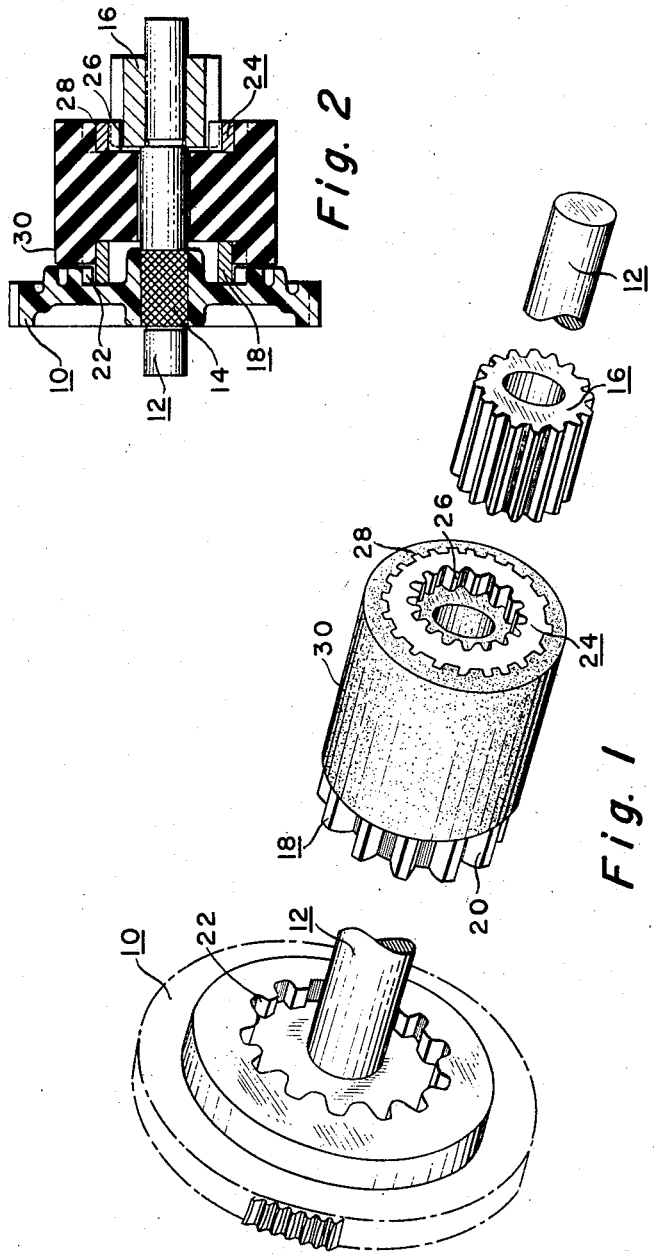
INVENTOR.
Herbert C. Porter
BY
*D. H. Strickland*
His Attorney

United States Patent Office 2,857,777
Patented Oct. 28, 1958

2,857,777
GEAR ASSEMBLY

Herbert C. Porter, Rochester, N. Y., assignor to General Motors Corporation, Detroit, Mich., a corporation of Delaware Application February 7, 1955, Serial No. 486,522

4 Claims. (Cl. 74—432)

This invention pertains to a gear assembly, and particularly to a gear assembly including driving and driven gears capable of limited torsional deflection relative to each other.

Heretofore, electric motor driven window regulators have been designed and produced. In some regulators the electric motor is directly coupled to a sector gear of the window regulating mechanism through reduction gearing, and to eliminate cost, the motor is stalled when the window is fully raised, lowered or encounters some other usual resistance. In devices of this character the pinion gear tends to become jammed in the sector gear. The present invention relates to a resilient coupling for such a gear assembly which obviates the aforementioned difficulty. Accordingly, among my objects are the provision of a gear assembly including coaxial driving and driven gears with a resilient coupling therebetween; and the further provision of a gear assembly of the aforesaid type wherein the driving connection between the two gears is constituted by a cushion of elastomeric material.

The aforementioned and other objects are accomplished in the present invention by interposing a cushion of elastomeric material between a driving gear and a driven gear which are coaxially mounted on a shaft. Specifically, the assembly includes a metallic shaft to which a worm gear is drivingly connected by any suitable means, such as splines. A pinion gear is rotatably journaled on the shaft. Thus, the driving and driven gears are coaxially mounted and maintained in spaced parallel planes by the rigid shaft which resists any bending forces that might otherwise cause misalignment between the gears.

If the worm gear is composed of nylon, a metallic insert is mechanically connected thereto. However, if the worm gear is metal, the insert may be integral therewith or metallurgically bonded thereto. The metallic pinion gear may be formed integral with, welded to, or mechanically connected to a second metallic insert. The use of mechanically connected inserts is merely an expedient aiding manufacturing economy, and ease of assembly and disassembly. In any event, a cushion of elastomeric material is bonded to the inserts, which cushion constitutes the flexible, torsionally deflective, driving connection between the two gears. The elastomeric cushion is subjected primarily to shear stresses during twisting of one gear relative to the other.

Further objects and advantages of the present invention will be apparent from the following description, reference being had to the accompanying drawing wherein a preferred embodiment of the present invention is clearly shown.

In the drawing:

Fig. 1 is an exploded isometric view of the gear assembly of this invention.

Fig. 2 is a longitudinal sectional view of the gear assembly.

The gear assembly of this invention is designed particularly for use in window regulating mechanism of the general type disclosed in the Simpson Patent 2,317,490 wherein an electric motor is drivingly connected with a worm gear which is fastened to a shaft, the shaft, in turn, having attached thereto a pinion gear that meshes with a rack or sector gear of the window regulating mechanism. In devices of this character it has been observed that in installations where to eliminate cost, the electric motor is stalled when the window is fully raised or lowered, the teeth of the pinion gear have a tendency to become jammed with the teeth of the sector gear or rack, whichever may be the case. To obviate this difficulty, the present invention contemplates the provision of a resilient coupling between the worm gear and the pinion gear that permits limited torsional deflection therebetween upon stalling of the motor.

Accordingly, the gear assembly of this invention, as depicted in the drawing, comprises a nylon worm gear 10 which is rigidly connected to a metallic shaft 12 by any suitable means, such as splines or knurls 14. The worm gear 10 constitutes the driving gear which is operatively connected through a worm to an electric motor, not shown. Accordingly, rotation of the worm gear 10 will impart rotation to the shaft 12. The driven gear of the assembly is constituted by a metallic pinion gear 16, which is rotatably journaled on the shaft 12. By virtue of the fact that gears 10 and 16 are coaxially mounted on the shaft 12, the gears are maintained in spaced parallel planes irrespective of the bending forces imposed thereon which may tend to cause misalignment of these gears.

With a nylon, or other suitable plastic worm gear, a metallic insert 18 having a straight splined external periphery 20 is drivingly connected to the worm gear 10 by engagement between the splines 20 and a mating set of splines 22 formed in the worm gear. If the worm gear 10 is composed of metal, the insert 18 may be formed integrally therewith or metallurgically bonded thereto, the only essential requirement being that the insert must be positively drivingly connected to the worm gear 10. Similarly, the pinion gear 16 is shown drivingly connected to a second insert 24 having internally and externally toothed peripheries 26 and 28, respectively. If desired, the insert 24 may likewise be integral with, or metallurgically bonded to the pinion gear 16. However, for ease of assembly and disassembly, it may be desirable to interconnect the insert 24 and the pinion gear 16 in the manner disclosed in the drawing.

The driving connection between the gear 10 and the gear 16 is constituted by a cushion 30 of elastomeric material. The elastomeric material, which may be any suitable natural or synthetic rubber, or rubberlike material, is bonded to inserts 18 and 24. It should be noticed that the cushion 30 is not bonded to the shaft 12. Moreover, by reason of the external teeth on both inserts 18 and 24, the cushion 30 is connected to these inserts both mechanically and through the bond therebetween.

The resultant gear assembly is such that limited torsional deflection is permitted between the gears 10 and 16 due to the resiliency of the elastomeric cushion 30. During torsional deflection between the two gears, the cushion is subjected primarily to shear stress. Moreover, whereas the cushion 30 constitutes the only driving connection between the gears 10 and 16, the shaft 12 prevents misalignment between the two gears.

When the gear assembly disclosed herein is used in window regulating mechanism of the type shown in the aforementioned Simpson patent, the resiliency provided by the cushion 30 prevents jamming of the pinion gear teeth with the sector gear or rack of the window regulating mechanism upon stalling of the motor, such as occurs when the window is either fully raised, lowered, or meets some other usual resistance.

While the embodiment of the present invention as herein disclosed, constitutes a preferred form, it is to be understood that other forms might be adopted.

What is claimed is as follows:

1. A gear assembly comprising, a shaft, a first gear drivingly connected to said shaft, a second gear rotatably journaled on said shaft, an insert operatively connected to said second gear, and a cushion of elastomeric material disposed between said insert and said first gear, said cushion being bonded to said insert and operatively connected to said first gear so as to constitute the driving connection between said gears while permitting limited torsional deflection between said gears upon abnormal loading of said second gear.

2. A gear assembly comprising, a shaft, a first gear drivingly connected to said shaft, a first insert operatively connected to said first gear, a second gear rotatively journaled on said shaft, a second insert operatively connected to said second gear, and a cushion of elastomeric material disposed between and bonded to said inserts, said cushion constituting the driving connection between said gears and permitting limited torsional deflection therebetween upon abnormal loading on said second gear.

3. A gear assembly comprising, a shaft, a plastic worm gear drivingly connected to said shaft, a first metallic insert drivingly connected to said first gear, a pinion gear rotatably journaled on said shaft, a second metallic insert drivingly connected to said pinion gear, and a layer of elastomeric material disposed between said inserts and bonded thereto, said elastomeric layer constituting the driving connection between said gears and permitting limited torsional deflection therebetween upon abnormal loading of said second gear.

4. The gear assembly set forth in claim 3 wherein said inserts are formed with toothed external peripheries.

References Cited in the file of this patent

UNITED STATES PATENTS

| | | |
|---|---|---|
| 1,646,427 | Skidmore | Oct. 25, 1927 |
| 1,983,007 | Simons | Dec. 4, 1934 |
| 2,003,116 | Hammond | May 28, 1935 |
| 2,173,226 | Blain | Sept. 19, 1939 |

FOREIGN PATENTS

| | | |
|---|---|---|
| 164,294 | Switzerland | Sept. 30, 1933 |
| 176,619 | Switzerland | Apr. 30, 1955 |